(12) United States Patent
Koshio

(10) Patent No.: US 9,469,160 B2
(45) Date of Patent: Oct. 18, 2016

(54) TIRE WITH TREAD HAVING BLOCKS HAVING CUTOUT PORTIONS

(75) Inventor: Makoto Koshio, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 1202 days.

(21) Appl. No.: 13/146,162

(22) PCT Filed: Jan. 26, 2010

(86) PCT No.: PCT/JP2010/050992
§ 371 (c)(1),
(2), (4) Date: Sep. 22, 2011

(87) PCT Pub. No.: WO2010/084988
PCT Pub. Date: Jul. 29, 2010

(65) Prior Publication Data
US 2012/0006456 A1    Jan. 12, 2012

(30) Foreign Application Priority Data
Jan. 26, 2009    (JP) ................................ 2009-014394

(51) Int. Cl.
| B60C 11/11 | (2006.01) |
| B60C 11/12 | (2006.01) |
| B60C 11/13 | (2006.01) |

(52) U.S. Cl.
CPC .............. B60C 11/11 (2013.01); B60C 11/125 (2013.04); B60C 11/1369 (2013.04); *B60C 11/12* (2013.01); *B60C 2011/0346* (2013.04); *B60C 2011/1213* (2013.04); *B60C 2011/133* (2013.04); *B60C 2200/06* (2013.04); *B60C 2200/14* (2013.04)

(58) Field of Classification Search
CPC ................. B60C 11/11; B60C 11/125; B60C 2011/133; B60C 2011/0346; B60C 11/12; B60C 2011/1213; B60C 11/1392
USPC ............. 152/209.15, 209.18, 209.21, DIG. 3
See application file for complete search history.

(56) References Cited

U.S. PATENT DOCUMENTS 3,875,986 A * 4/1975 Boileau ............... B60C 11/0306
152/209.24
4,676,290 A * 6/1987 Tansei et al. ............ 152/209.22

(Continued)

FOREIGN PATENT DOCUMENTS

| GB | 862910 | 3/1961 |
| GB | 2 021 494 A | 12/1979 |

(Continued)

OTHER PUBLICATIONS

Machine translation for Japan 05-254314 (no date).*

(Continued)

*Primary Examiner* — Steven D Maki
(74) *Attorney, Agent, or Firm* — Sughrue Mion, PLLC

(57) ABSTRACT

Provision of a tire with enhanced wet weather performance while maintaining resistance to uneven wear performance without entailing an increase in the tread rubber volume. A center block row (30) is formed extending along the tire circumferential direction U in a tread section (18). Blocks (33) configuring the center block row (30) when viewed from the tread face side are formed with long sides (34H) adjacent to respective main grooves (20L), (20R) and short sides (34S1), (34S2). Cutout portions (21) are formed in the blocks (33) on the sides of the long sides (34H).

11 Claims, 7 Drawing Sheets

(56) References Cited

U.S. PATENT DOCUMENTS

| | | | |
|---|---|---|---|
| 5,031,680 A * | 7/1991 | Kajikawa et al. | 152/209.18 |
| 2004/0238092 A1* | 12/2004 | Colombo et al. | 152/209.15 |
| 2006/0081317 A1* | 4/2006 | Suzuki et al. | 152/209.18 |
| 2010/0096055 A1* | 4/2010 | Shibano | 152/209.25 |

FOREIGN PATENT DOCUMENTS

| | | | |
|---|---|---|---|
| GB | 2 124 163 A | | 2/1984 |
| JP | 54-088503 A | * | 7/1979 |
| JP | 61-102301 A | | 5/1986 |
| JP | 2-53608 A | | 2/1990 |
| JP | 3-136911 A | | 6/1991 |
| JP | 05-254314 A | * | 10/1993 |
| JP | 09-136514 A | * | 5/1997 |
| JP | 11-245628 A | * | 9/1999 |
| JP | 2001-199206 A | * | 7/2001 |
| JP | 2004-299592 A | * | 10/2004 |
| JP | 2004-537453 A | | 12/2004 |
| JP | 2006-056459 A | * | 3/2006 |
| JP | 2007-145209 A | | 6/2007 |
| JP | 2009-6870 A | | 1/2009 |
| JP | 2001-191739 A | * | 7/2009 |
| WO | 03/013881 A1 | | 2/2003 |
| WO | 2008/152914 A1 | | 12/2008 |

OTHER PUBLICATIONS

Machine translation for Japan 2001-191739 (no date).*
Machine translation for Japan 09-136514 (no date).*
Machine translation for Japan 2006-056459 (no date).*
Machine translation for Japan 2004-299592 (no date).*
Machine translation for Japan 2001-199206 (no date).*
Machine translation for Japan 11-245628 (no date).*
Chinese Office Action issued in Chinese Application No. 201080005447.8 dated Feb. 5, 2013.
Extended European Search Report, dated Apr. 12, 2013, issued in corresponding European Patent Application No. 10733594.5.
International Search Report of PCT/JP2010/050992 dated Apr. 13, 2010.

* cited by examiner

TIRE WITH TREAD HAVING BLOCKS HAVING CUTOUT PORTIONS

CROSS REFERENCE TO RELATED APPLICATIONS

This application is a National Stage of International Application No. PCT/JP2010/050992, filed on Jan. 26, 2009, which claims priority from Japanese Patent Application No. 2009-014394, filed on Jan. 26, 2009, the contents of all of which are incorporated herein by reference in their entirety.

TECHNICAL FIELD

The present invention relates to a tire formed with a tread section having block rows extending along the tire circumferential direction formed by circumferential direction grooves and lateral grooves.

BACKGROUND ART

Uneven wear can occur with a tire, depending in particular on the conditions of use (see, for example, Patent Document 1 regarding a pattern for suppressing uneven wear). Uneven wear here refers to blocks wearing non-uniformly. When such uneven wear occurs then this readily causes a dramatic decrease in the wear life of the tire.

Block profiles configured to give uniform wearing energy across the surface of the blocks have already been considered as countermeasures to such uneven wear. The wearing energy on the block surface is represented by the product of the shearing force acting at the block surface (namely the product of the contact pressure and the coefficient of friction) with the sliding length of the block surface on the road surface.

In order to secure stability a design has also been put forward that increases the edge component of blocks to enhance wet weather performance (braking performance on a wet road).
Patent Document 1: 2007-145209

DISCLOSURE OF INVENTION

Technical Problem

However, when striving to make the wearing energy uniform to suppress uneven wear it becomes difficult to secure the edge components of blocks, and difficult to achieve sufficient wet weather performance. However, when the tread rubber volume is increased in order to raise the wear life resistance to heat falls, resulting in heat related damage tending to increase and tending to lead to wear life falling. An increase in tread rubber volume also has the adverse effect of increasing manufacturing cost.

The present invention is made in consideration of the above circumstances and is directed towards provision of a tire with raised wet weather performance while maintaining resistance to uneven wear performance, without entailing an increase in tread rubber volume.

Solution to Problem

A first aspect of the present invention is a tire including plural blocks formed in a tread section by circumferential direction grooves and lateral grooves, wherein each of the blocks is a polygonal shape viewed from the tread face side including long sides adjacent to the circumferential direction grooves and short sides, and a cutout portion is formed on at least one of the long sides of the blocks.

Reference here to a polygonal shape includes shapes with beveled corner portions. Reference to a cutout portion includes indented portions of rounded form and gentle indented profiles.

In order to secure wet weather performance there is a need to the secure edge component of blocks, as explained above. In the first aspect of the present invention the edge component is increased by provision of the cutout portions to the blocks.

The blocks are polygonal shaped when viewed from the tread face side, including long sides adjacent to the circumferential direction grooves and short sides, and a cutout portion is formed on the side of at least one of the long sides of the blocks. Namely, cutout portions are formed on the side of the long sides rather than on the side of the short sides. This accordingly results in block rigidity being less readily reduced than when cutout portions are formed on the side of the short sides of blocks, or when cutout portions are formed to blocks having uniform lengths for each of the sides. Consequently, resistance to uneven wear performance is secured since there is little localized flow of block rubber and the wearing energy applied to the block tread face side becomes more uniform. A further effect is obtained of distributing side force that is a cause of uneven wear.

The edge component is increased by the cutout portions and so wet weather performance can be enhanced.

A second aspect of the present invention is a tire wherein the long sides are formed together with the cutout portions on both the tire width direction sides of the block.

The effects of the first aspect of the invention can be enhanced by adopting such a configuration.

A third aspect of the present invention is a tire wherein: the external profile of each of the cutout portions when seen in plan view is a triangular shape including a bottom side formed by at least a portion of the long side and a long sloping side and a short sloping side having different lengths from each other; and along one tire circumferential direction the disposed sequence of the long sloping side and the short sloping side is different on one tire width direction side of the block to on the other width direction side of the block.

A consideration when forming cutout portion there that the probability of cracks developing increases with the number of corner portions (bend portions) of the indented shapes configuring the cutout portions. Therefore forming the cutout portions with a triangular shaped external profile viewed in plan view, as in the third aspect of the present invention, results in cutout portions with only a single corner portion, reducing the possibility of cracks developing.

Furthermore, the external profile described above is a triangular shape including the bottom side formed by at least a portion of the long side and the long sloping side and the short sloping side having different lengths from each other, and along one tire circumferential direction the disposed sequence of the long sloping side and the short sloping side is different on one tire width direction side of the block to on the other width direction side of the block. By adopting such a configuration, change in length reduction of the tire width direction separation distance on the block face due to forming the cutout portions is readily suppressed over the entire length of the cutout portions. Consequently, suppressing localized weakening in the block rigidity from occurring in the tire circumferential direction due to forming the cutout portions.

A fourth aspect of the present invention is a tire, wherein: the shape of the cutout portions is symmetrical about a point at the center of the block; and the block is formed with a block traversing groove that is open on the two tire width direction sides of the block further to side of the long sloping side than an intersection point between the short sloping side and the long sloping side.

In the fourth aspect of the present invention the shape of the cutout portions is symmetrical about a point at the center of the block, enhancing suppression of localized weakening from occurring in block rigidity in the tire circumferential direction due to forming the cutout portions.

When the external profile of the cutout portions in plan view has a groove open to the short sloping side from the sloping sides of the triangular shape then the rigidity of the block portions adjacent to the opening is readily reduced, with a tendency for cracks to occur. However in the fourth aspect of the present invention, the block traversing grooves that cut across the blocks do not open onto the short sloping sides, and so the rigidity of the block portions forming openings is not readily reduced.

A fifth aspect of the present invention is a tire wherein the length ratio of the short side to the long side is in the range of 25 to 85%.

Less than 25% results in uneven wear readily occurring at the block side on the short side even though the cutout portions are not formed to the side of the block short sides. However, when greater than 85% it becomes difficult to achieve sufficient suppression effect of uneven wear on the block sides of the long sides formed with the cutout portions.

A sixth aspect of the present invention is a tire wherein a tire width direction separation distance between one side width direction end of the corresponding cutout portion and the other side width direction end of the cutout portion is in the range of 7 to 12% of the tire width direction separation distance between one side width direction end of the block and the other side width direction end of the block.

Wet weather performance is readily reduced at less than 7%. However the wear life of the tire is readily reduced at greater than 12%.

A seventh aspect of the present invention is a tire wherein: the depth of the cutout portion at the deepest location from the tread face is in the range of 20 to 40% of the depth of the circumferential direction groove adjacent to the cutout portion; and the wall face of the cutout portion slopes downwards from the tread face.

Wet weather performance is readily reduced when shallower than 20%. However, the wearing energy acting on the block tread face tends to be uneven when deeper than 40%, making it difficult to achieve sufficient resistance to uneven wear performance. The depth of the deepest location from the tread face of the cutout portion is more preferably in the range of the 25% to 35% of the depth of the circumferential direction groove adjacent to the cutout portion.

The wall face of the cutout portion also slopes down from the tread face and so a reduction in the block rigidity due to forming the cutout portions can be further suppressed.

Advantageous Effects of Invention

The present invention enables a tire to be achieved with enhanced wet weather performance while maintaining resistance to uneven wear performance, without entailing an increase in tread rubber volume.

DESCRIPTION OF EMBODIMENTS

Figure 1:
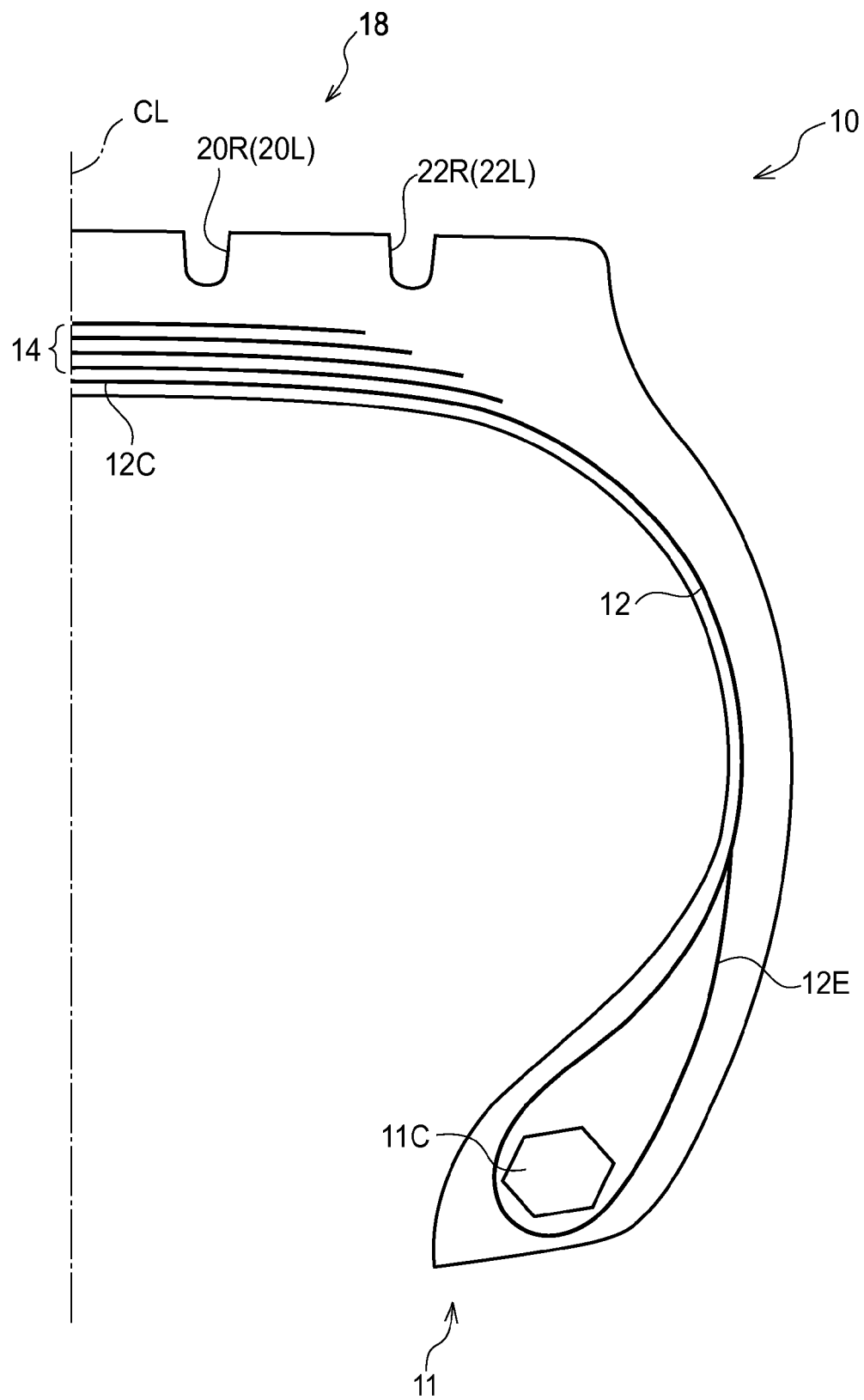
FIG. 1 is a radial direction cross-section of a pneumatic radial tire according to an exemplary embodiment of the present invention.

Explanation follows regarding an exemplary embodiment of the present invention, with an example of a pneumatic radial tire as an exemplary embodiment. As shown in FIG. 1, a pneumatic radial tire 10 according to an exemplary embodiment of the present invention is a tire for a truck or bus, and is equipped with a carcass 12. The carcass 12 includes folded over portions 12E at the two edge portions where the carcass 12 is folded around bead cores 11C of bead sections 11.

Belt layers 14 are buried at the tire radial direction outside of a crown section 12C of the carcass 12. A tread section 18 disposed with grooves is formed at the tire radial direction outside of the belt layers 14 (see also FIG. 2).

Figure 2:
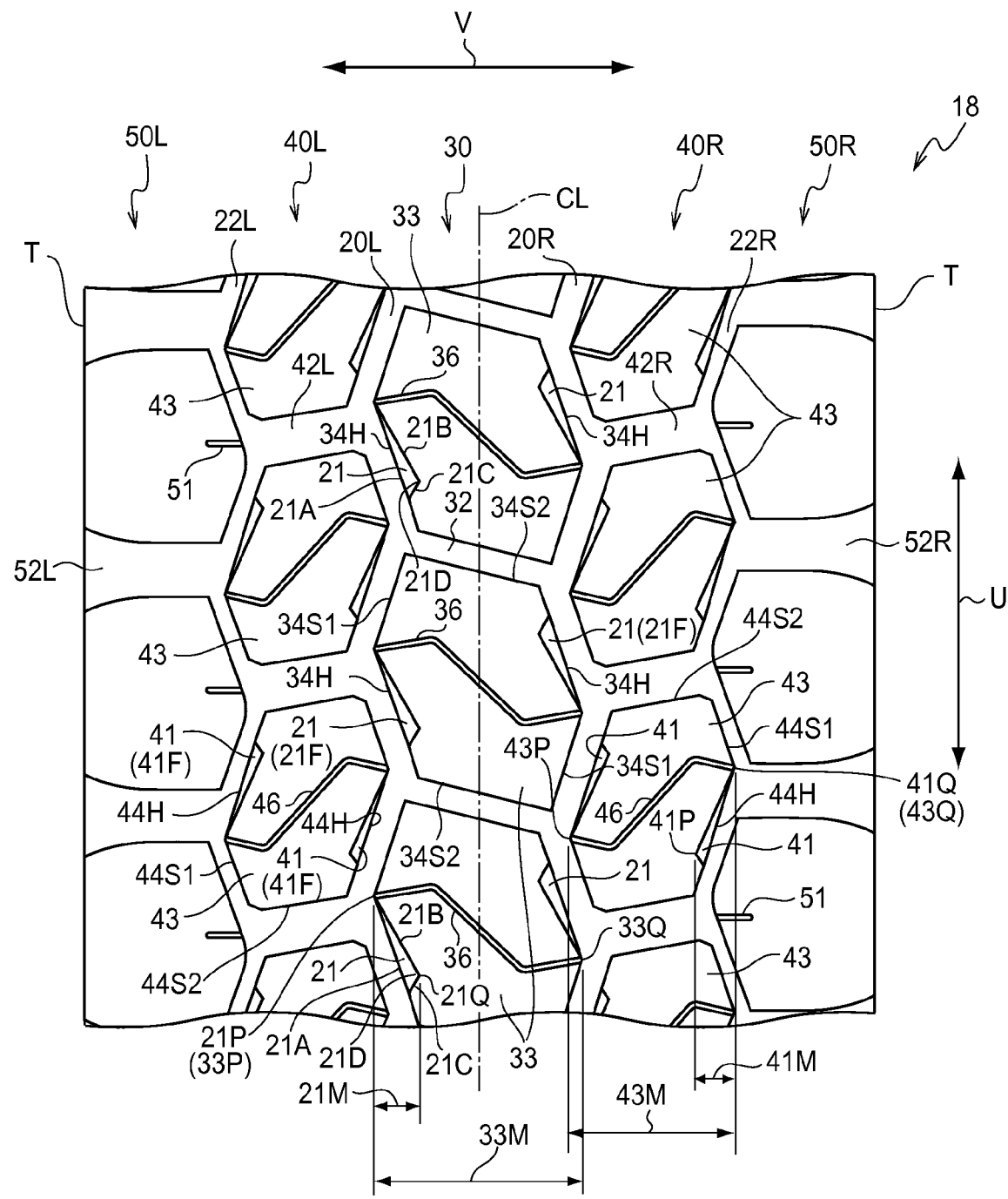
FIG. 2 is a plan view illustrating a tread section of a pneumatic radial tire according to an exemplary embodiment of the present invention.

As shown in FIG. 2, four main grooves 20L, 20R, 22L, 22R are formed in the tread section 18 along the circumferential direction at both sides of a tire center line CL. The tread section 18 is formed by the presence of the 4 main grooves into 5 block rows running along the tire circumferential direction U. The 5 block rows configure: a center block row 30 through which the tire center line CL passes; second block rows 40L, 40R adjacent on the left and right sides of the center block row 30; and shoulder block rows 50L, 50R positioned at the outside in the tire width direction V of the second block rows 40L, 40R.

The four main grooves are configured by main grooves 20L, 20R positioned on the center side (the tire center line side), and main grooves 22L, 22R positioned on the shoulder side. The four main grooves 20L, 20R, 22L, 22R extend in zigzag shapes along the tire circumferential direction. Extending in zigzag shapes along the tire circumferential direction refers to extending along the tire circumferential direction with groove portions that are inclined to the tire circumferential direction and repeatedly fold back on each other so as to then be inclined in a different direction.

Lug grooves 32 are formed in the center block row 30 so as to connect together locations where the separation distance between the main groove 20L and the main groove 20R is smaller due to the zigzag extending shape of the main grooves 20L, 20R.

Similarly, lug grooves 42L are formed in the second block row 40L at locations where the separation distance between the main groove 20L and the main groove 22L is smaller due to the zigzag extending shape of the main grooves 20L, 22L. Lug groove 42R are also formed in the second block row 40R at locations where the separation distance between the main groove 20R and the main groove 22R is smaller due to the zigzag extending shape of the main grooves 20R, 22R.

Figure 3:
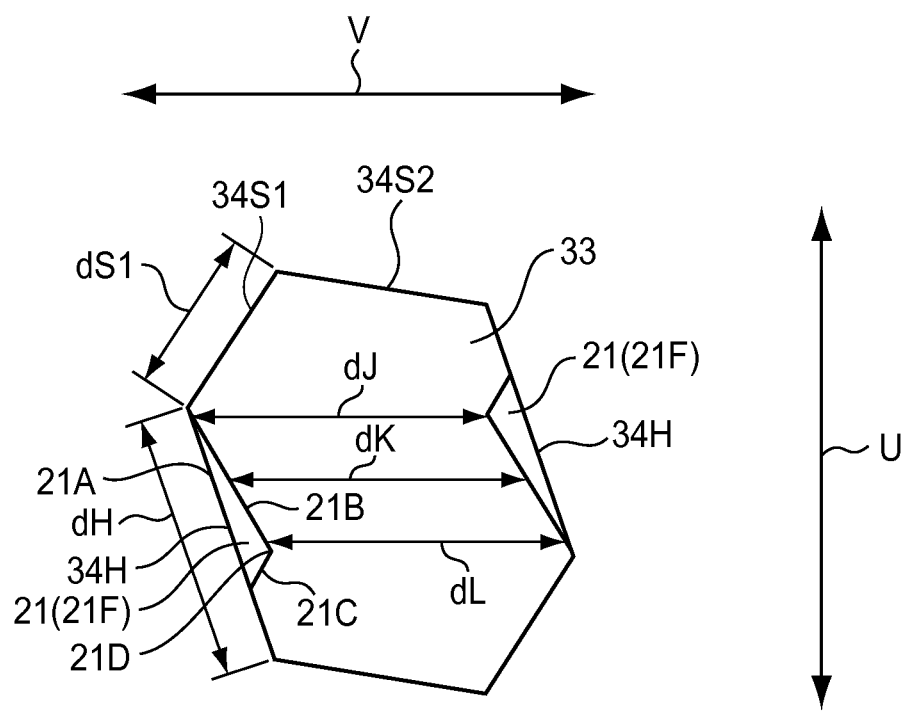
FIG. 3 is an explanatory diagram illustrating the external profile of a block configuring a center block row in a pneumatic radial tire according to the exemplary embodiment of the present invention, as viewed from the tread face side.

Configuration with main grooves (circumferential direction grooves) and lug groove is such a pattern results in blocks 33 configuring the center block row 30 that are hexagonally shaped when viewed from the tread face side, with a tire width direction length (the tire width direction cross-sectional length) that increases from both tire circumferential direction ends of the blocks 33 to a block central portion. Each of the sides forming the hexagonal shape is set by the separation distance between the main groove 20L and the main groove 20R and by the dimensions of the zigzag shape of the main grooves 20L, 20R, so as to form long sides 34H on the two tire width direction ends of each of the blocks 33 and to form short sides 34S1, 34S2 on the other sides. In the present exemplary embodiment, as shown in FIG. 2 and FIG. 3, the short sides 34S1 are shorter in length than the short sides 34S2. The short sides 34S1 are adjacent to either the main groove 20L or the main groove 20R. The length ratio of the shorter short sides 34S1 with respect to the long sides 34H is in the range of 25 to 85%, namely, as shown in FIG. 3, the short side length dS1 of the short side 34S1 is in the range of 25 to 85% of the long side length dH.

Cutout portions 21 are formed in the sides of the long sides 34H at both sides of the blocks 33 in the tire width direction. A tire width direction separation distance 21M between one side tire width direction end 21P of the cutout portion 21 and the other tire width direction end 21Q of the cutout portion 21 is in the range of 7 to 12% of the tire width direction separation distance 33M between one side tire width direction end 33P of the block 33 and the other side tire width direction end 33Q of the block 33.

The depth from the tread face at the deepest location of the cutout portions 21 is in the range of 20 to 40% of the depth of the main groove adjacent to the cutout portions 21 (the main groove 20L or the main groove 20R). A wall face 21F of the cutout portions 21 slopes downwards from the tread face (namely slopes downwards from the tread face). Configuration may, however, be made such that the depth of the cutout portions 21 is the same as that of the main grooves, and the wall face is not sloped in this manner.

Blocks 43 configuring the second block row 40L are also, similarly to the blocks 33, hexagonal shaped when viewed from the tread face side with the tire width direction length increasing from both tire circumferential direction ends of the blocks 43 to a block central portion. Each of the sides forming the hexagonal shape is set by the separation distance between the main groove 20L and the main groove 22L, and the dimensions of the zigzag shape of the main grooves 20L, 22L, so as to form long sides 44H on the two tire width direction sides of each of the blocks 43, and short sides 44S1, 44S2 on the other sides. In the present exemplary embodiment, as shown in FIG. 2, the short sides 44S1 are shorter in length than the short sides 44S2. The short sides 44S1 are adjacent to either the main groove 20L or the main groove 22L. The length ratio of the shorter short sides 44S1 to the long sides 44H is in the range of 25 to 85%.

Cutout portions 41 are formed at both tire width direction sides of the blocks 43 on the long sides 44H side. A tire width direction separation distance 41M between one side tire width direction end 41P of the cutout portion 41 and the other tire width direction side end 41Q of the cutout portion 41 is in the range of 7 to 12% of the tire width direction separation distance 43M between one side tire width direction end 43P of the block 43 and the other side tire width direction end 43Q of the block 43.

The depth of the cutout portions 41 is in the range of 20 to 40% of the depth of the main groove adjacent to the cutout portions 41 (the main groove 20L or the main groove 22L). A wall face 41F of the cutout portion 41 slopes downwards from the tread face (namely slopes downwards from the tread face).

The second block row 40R is also configured similarly to the second block row 40L.

The shape of the cutout portions 21 are symmetrical about a point at the block center. The external profile of each of the cutout portions 21 in plan view is a triangular shape, formed with a bottom side 21A formed by a portion of the long side 34H, and two sides of different lengths from each other, a long sloping side 21B and a short sloping side 21C. There is accordingly a single corner portion (bend portion) 21D formed in plan view with an indented shape in the cutout portion 21. Similar applies to the cutout portions 41 formed in the blocks 43.

Lug grooves 52L are formed in the shoulder block row 50L, are connected to the main groove 22L and extend further to the tire width direction outside than a tread edge T. Lug grooves 52R are also formed in the shoulder block row 50R, are connected to the main groove 22R and extend further to the tire width direction outside than a tread edge T. Reference to the tread edges here indicates the tire width direction outermost ground contact portion when the pneumatic radial tire is mounted to a standard rim, as defined in the JATMA YEAR BOOK (2008 edition, Japan Automobile Tire Manufacturers Association standards), inflated to an internal pressure of 100% of the pressure (maximum pressure) corresponding to maximum load (load shown in bold type in the internal pressure-load chart) in the JATMA YEAR BOOK for the applicable size/ply rating, and applied with the maximum load. Where the location of use or manufacturing location uses TRA standards or ETRTO standards then these respective standards are applied.

Fine grooves (water grooves) 36 are formed in the center block row 30 and are connected to the main grooves 20L, 20R. Each of the fine grooves 36 is shaped like a crank, with the locations of the end portions of the lug grooves 42L, 42R located at the end positions of the fine groove 36.

Fine grooves (water grooves) 46 are also formed in the second block rows 40L, 40R, each in the shape of a crank and connecting the main grooves 20L, 22L. The location of the end portion of the lug groove 52L of the shoulder block row 50L and the location of the end portion of the lug groove 32 of the center block row 30 are located at the two end positions of each of the fine grooves 46 of the second block row 40L. The location of the end portion of the lug grooves 52R of the shoulder block row 50R and the location of the end portion of the lug groove 32 of the center block row 30 are similarly located at the two end positions of each of the fine grooves 46 of the second block row 40R.

Accordingly in the present exemplary embodiment the fine grooves 36 are open at the tire width direction sides of the blocks 33 further towards the long sloping side than the corner portion 21D. Similar applies to the fine grooves 46.

Fine grooves 51 are also formed in the shoulder block row 50L so as to be connected to the main groove 22L, extend in the tire width direction and be closed off inside the blocks. The location of the end portion of the lug groove 42L of the second block row 40L is located at the position extended out from each of the fine grooves 51. Fine grooves 51 are similarly also formed in the shoulder block row 50R.

As explained above, in the present exemplary embodiment the edge component of the blocks 33, 43 is increased and wet weather performance is enhanced by forming the cutout portions 21 in the sides of the blocks 33 on the long sides and forming the cutout portions 41 in the sides of the blocks 43 on the long sides.

When viewed from the tread face side both the blocks 33 and the blocks 43 are formed in hexagonal shapes with a width direction length that increases from the two tire circumferential direction sides of the block to a block central portion, with the hexagonal shapes formed with both long sides (the long sides 34H or the long sides 44H) and short sides. The cutout portions 21, 41 are also both formed so as to be adjacent to the main grooves that are adjacent to the long sides of the blocks (the main grooves 20L, 20R, 22L or 22R). Namely, the cutout portions 21, 41 are formed so as to encroach into the blocks from the side of the long side and not from the side of the short side. Accordingly, even though the cutout portions are formed the block rigidity is less readily lowered in comparison to cases in which the cutout portions of the blocks are adjacent to the lug grooves 32, 42L, 42R, or case in which the cutout portions are formed in at least one side of the sides of blocks having sides that are all of the same length as each other. Accordingly, sufficient resistance to uneven wear is maintained, due to there being little block rubber localized flow, and abrasion energy applied from the tread face side of the blocks 33 and the blocks 43 being easily made uniform. In addition an effect of dissipating side force that cause uneven abrasion is obtained.

The edge component of the blocks 33 and the blocks 43 is increased by the presence of the cutout portions 21, 41 and sufficient wet weather performance can be maintained.

The blocks 33 and the blocks 43 have a length ratio of the short side to the long side in the range of 25 to 85%. Accordingly uneven wear on the side of the blocks on the long sides formed with the cutout portions 21, 41 can be sufficiently suppressed and uneven wear on the side of the blocks on the short sides can also be sufficiently suppressed.

The tire width direction separation distance 21M between the one side tire width direction end 21P of the cutout portion 21 and the other end tire width direction side 21Q of the cutout portion 21 is in the range of 7 to 12% of the tire width direction separation distance 33M between the one side tire width direction end 33P of the block 33 and the other side tire width direction end 33Q of the block 33. Similar applies to the cutout portions 41. Accordingly sufficient enhancement of wet weather performance can obtained, and a deterioration in the wear life of the tire can also be sufficiently suppressed.

The depth of the cutout portions 21, 41 is in the range of 20 to 40% of the depth of respective adjacent main groove, hence achieving a configuration readily able to secure resistance to uneven wear as well as enhancing wet weather performance.

The depth of the cutout portions 21 is in the range of 20 to 40% of the depth of the respective adjacent groove to the cutout portions 21. The wall face 21F of each of the cutout portions 21 slopes downwards from the tread face (namely slopes downwards form the tread face). Namely the block rigidity in the cutout portions 21 is raised at the block skirt sides, further enabling suppression of a fall in block rigidity due to the presence of the cutout portions 21, 41.

The external profile of the cutout portions 21 is a triangular shape in plan view, with a bottom side 21A formed by a portion of the long side 34H, and with two sides of different lengths from each other, the long sloping side 21B and the short sloping side 21C. There is a single corner portion (bend portion) 21D formed in an indented shape in the cutout portions 21 in plan view.

The eternal profile in plan view of the cutout portions 21 formed at the two tire width direction sides of the blocks 33 is such that the cutout portions 21 are formed in the tire width direction sides so as to face different directions to each other (namely, along one of the tire circumferential directions the disposed sequence of the long sloping side 21B and the short sloping side 21C is the opposite at one tire width direction side of the block 33 to at the other tire width direction side of the block 33). Accordingly, change in length reduction of the tire width direction separation distance on the block face due to forming the cutout portions 21 is readily suppressed over the entire length of the cutout portions 21. Forming the shape of the cutout portions 21 in the present exemplary embodiment so as to be symmetrical about a point at the center of the blocks 33 is optimal from the perspective of suppressing the change referred to above. For example, as shown in FIG. 3, the tire width direction separation distances dJ, dK, dL between the cutout portions are substantially the same as each other even though their locations along the tire circumferential direction differ. The length reduction in the tire width direction separation distance of the block surface due to forming the cutout portions 21 is substantially the same length across the entire length of the cutout portions 21. Accordingly, the block rigidity in the tire circumferential direction can be sufficiently suppressed from localized weakening even though the cutout portions 21 are formed. When cutout portions are formed in blocks the probability of cracks developing can be thought of as increasing by the increase in the number of corner portions configuring the cutout portions. Accordingly, configuring the cutout portions 21 with a triangular external profile in plan view as in the present exemplary embodiment results in there being only a single corner portion 21D as an indentation formed in the cutout portions 21, accordingly lowering the possibility of cracks developing.

Similar applies to the cutout portions 41.

The fine grooves (water grooves) 36 are formed in each of the blocks 33 of the center block row 30, and the fine grooves (water grooves) 46 are formed in each of the blocks 43 of the second block rows 40L, 40R. The wet weather performance and traction performance is accordingly enhanced.

The fine grooves 36 are also formed in the blocks 33 such that they cut across the blocks 33 and are open at both tire width direction sides. The fine grooves 36 are open further to the side of the long sloping side than the corner portion 21D. The fine grooves 46 are formed similarly to the blocks 43. The rigidity of the block portion forming an opening would readily decrease were a groove to open on the short sloping side 21C, this being the shorter of the sloping sides in the triangular external profile of the cutout portions 21 in plan view, leading to a tendency for cracks to develop.

According, even though the fine grooves 36, 46 are formed cutting across the blocks 33, 43 and open to the two tire width direction sides in the present exemplary embodiment, the rigidity of the block portions forming the openings of the fine grooves 36, 46 is not readily decreased.

Figure 4A:
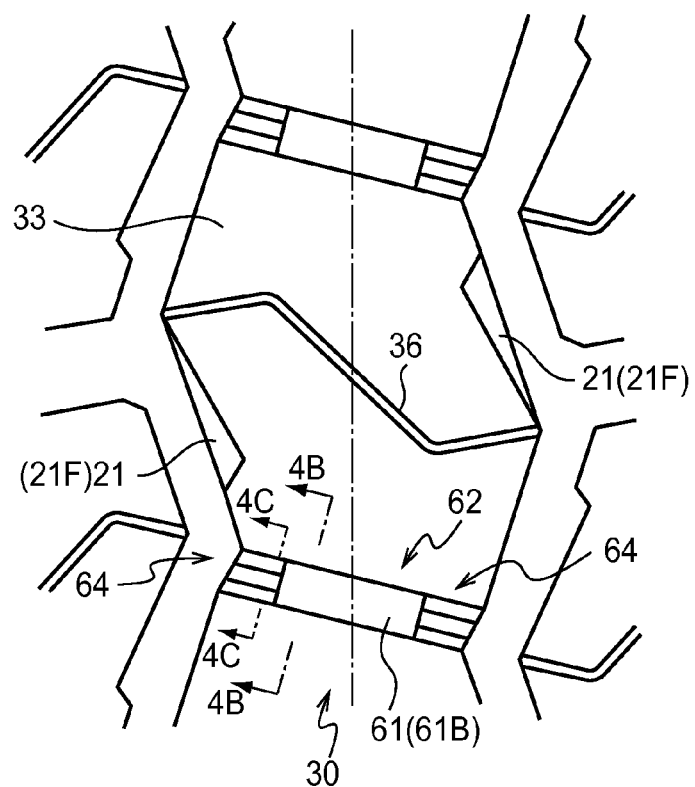
FIG. 4A is a plan view of a tread section of a modified example of a pneumatic radial tire according to the exemplary embodiment of the present invention.
Figure 4B:
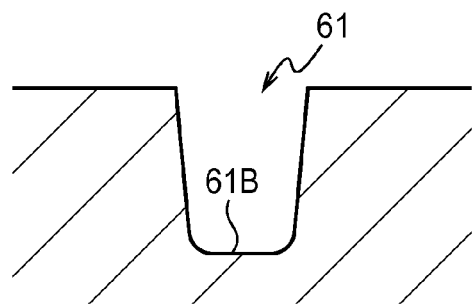
FIG. 4B is a lateral cross-section taken on arrow 4B-4B of FIG. 4A.
Figure 4C:
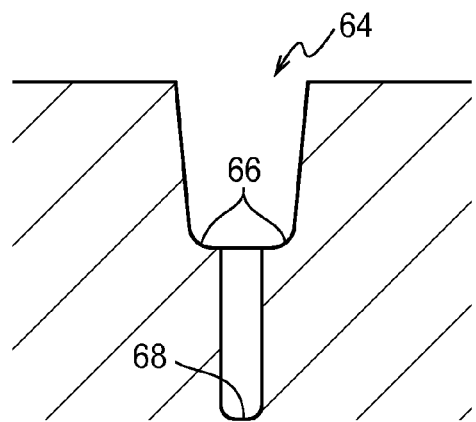
FIG. 4C is a lateral cross-section taken on arrow 4C-4C of FIG. 4A.

As shown in FIG. 4A, configuration may be made with the center block row 30 formed with lug grooves 62 to which tie-bars 61 have been formed. The tie-bars are groove portions formed with a raised bottom portion 61B. The circumferential direction rigidity of the blocks 33 can be raised by forming the tie-bars 61, enabling uneven wear to be further suppressed. In such cases, as shown in FIG. 4C, configuration may be made with the groove portions 64 adjacent to the two ends of the tie-bars 61 formed with shallow bottom portions 66 that are the same depth as that of the tie-bars 61, and with deep bottom portions 68 that are deeper than the tie-bars 61 at the groove center side.

Test Examples

In order to confirm the effect of the present invention, the present inventor prepares an example of the pneumatic radial tire 10 of the exemplary embodiment (referred to as Example Tire), an example of a conventional pneumatic radial tire (referred to below as Conventional Tire Example), and 3 examples of pneumatic radial tires for comparison (referred to below as Comparative Example Tires 1 to 3), and perform an evaluation of performance according to performance testing of abrasion resistance performance and braking performance. The size of all of the tires in the tests is "11R/22.5".

The Conventional Example Tire and the Comparative Examples Tires of 1 to 3 are tires that have different block shapes compared to the Example Tire. The Conventional Example Tire and the Comparative Examples Tires 1 to 3 are not formed with the fine grooves (water grooves) 36 or the tie-bars 61 described in the above exemplary embodiment. Accordingly, in order to align test conditions the Example Tire is also not formed with the fine grooves 36 or the tie-bars 61.

Figure 8:
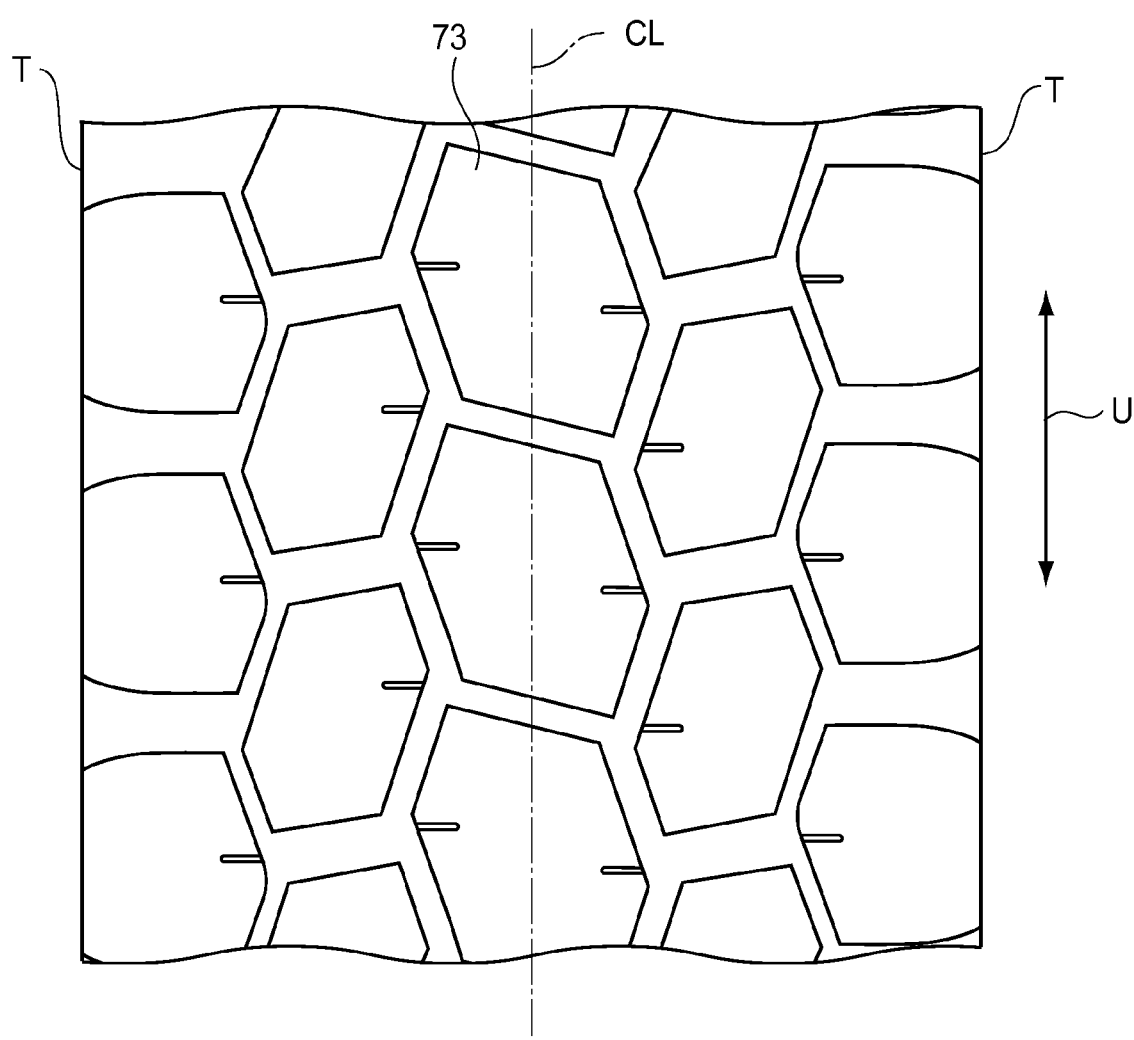
FIG. 8 is a plan view illustrating a tread section of a Conventional Example Tire employed in Test Examples.
Figure 9:
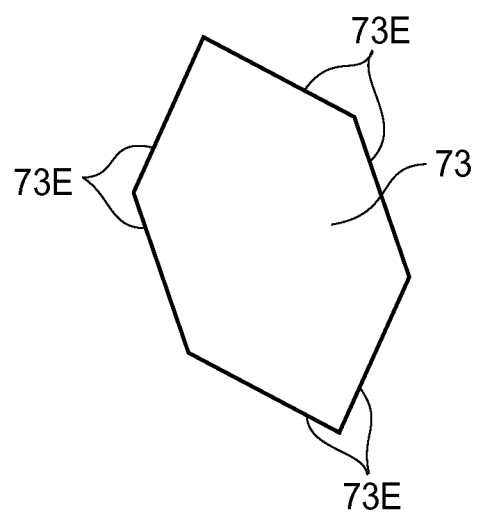
FIG. 9 is an explanatory diagram illustrating the external profile of a block configuring a center block row in a Conventional Example Tire employed in Test Examples, as viewed from the tread face side.

The Conventional Example Tire is, as shown in FIGS. 8 and 9, a tire formed with hexagonal shaped blocks 73 with sides 73E on the tread face that are all the same length as each other. Accordingly, there are no cutout portions formed in the blocks.

Figure 5:
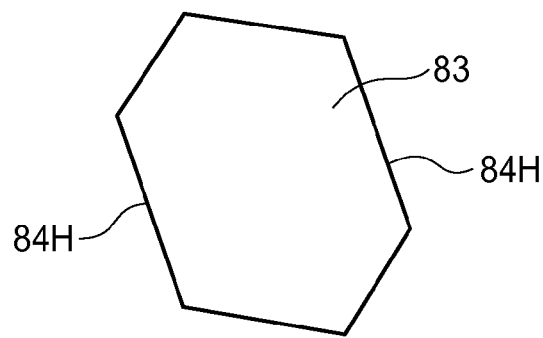
FIG. 5 is an explanatory diagram illustrating the external profile of a block configuring a center block row in a Comparative Example Tire 1 employed in Test Examples, as viewed from the tread face side.

The Comparative Example Tire 1, as shown in FIG. 5, is a tire with hexagonal shaped blocks 83 having a long side 84H on each side of the tread face in the tire width direction, and short faces on the other sides, with no cutout portions formed. Namely, it is a tire that differs from the Example Tire by not being formed with the cutout portions 21.

Figure 6:
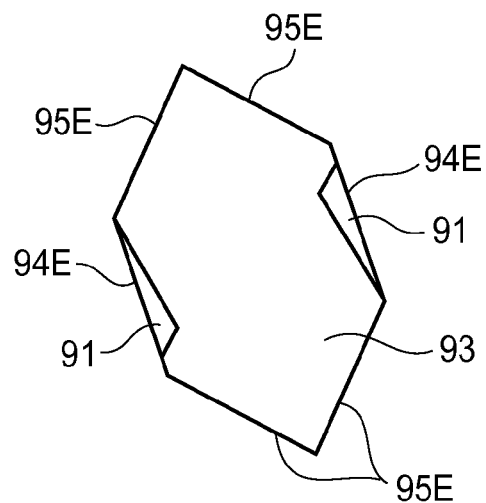
FIG. 6 is an explanatory diagram illustrating the external profile of a block configuring a center block row in a Comparative Example Tire 2 employed in Test Examples, as viewed from the tread face side.

The Comparative Example Tire 2, as shown in FIG. 6, is a tire formed with hexagonal shaped blocks 93 with tread face sides 94E that are all the same length as each other, however the tire has cutout portions 91 formed at both tire width direction sides of the tread face. Namely, it is a tire that differs from the Conventional Example Tire by being formed with the cutout portions 91 on the two tire width direction sides.

Figure 7:
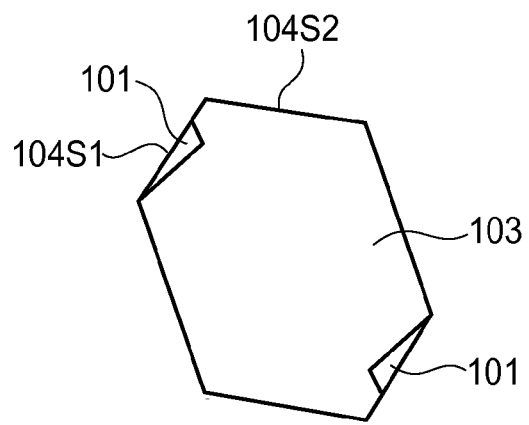
FIG. 7 is an explanatory diagram illustrating the external profile of a block configuring a center block row in a Comparative Example Tire 3 employed in Test Examples, as viewed from the tread face side.

The Comparative Example Tire 3, as shown in FIG. 7, is a tire disposed with a row of blocks 103 formed on the two tire width direction sides with cutout portions 101 at the side of the short sides 104S1, these being the shorter of the short sides 104S1, 104S2, in place of the cutout portions 21 formed in the blocks 33 of the Example Tire.

The Example Tire has a tire width direction separation distance 21M of the cutout portions 21 set at 10.7% of the tire width direction separation distance 33M of the blocks 33, and has a depth from the tread face of the cutout portions 21 of the deepest location set at 30% of the depth of the respective main groove (20L, 20R) adjacent to the cutout portions 21.

The following tests are performed regarding resistance to uneven wear performance. With respect to the vehicle, front mounting of a 2D4 is used for each vehicle. Namely a vehicle with two drive axles is employed, with test tires disposed on both sides of the front axle, and conventional tires employed on both sides of the rear axle (same as the Conventional Example Tires). Accordingly, each vehicle is mounted with 2 test tires and 2 conventional tires.

Each vehicle is run for 150,000 km. Tire rotation is performed in running every 10% of the running distance (namely at every 15,000 km of running). After completing running for 150,000 km the block volume is measured for each of the test tires, and the amount of uneven wear determined from the reduction amount of block volume.

A relative evaluation index is computed for the other tires with respect to an evaluation value for resistance to uneven wear performance of the Conventional Example Tire set at 100. The evaluation results are shown in Table 1. The greater the evaluation index in the evaluation results in Table 1 the higher the performance, namely the greater value indicates excellent resistance to uneven wear performance.

TABLE 1

|  | Example Tire 1 | Conventional Example Tire | Comparative Example Tire 1 | Comparative Example Tire 2 | Comparative Example Tire 3 |
| --- | --- | --- | --- | --- | --- |
| Wet Weather Performance | 110 | 100 | 100 | 110 | 110 |
| Resistance to Uneven Wear Performance | 99 | 100 | 100 | 93 | 90 |

It can be seen from Table 1 that the Example Tire and the Comparative Example Tire 1 have equivalent resistance to uneven wear performance to the Conventional Example Tire.

Braking performance testing is performed as set out below.

A 2D4 is employed as the vehicle. All of the tires are inflated to an internal pressure of 775 kPa. All of the tires are applied with a load of 3000 kg.

The braking distance is measured on a test course when brakes are applied at a running speed of 80 km/h. The test is performed 4 times for each of the tires, and the average braking distance determined.

A relative evaluation index is computed for the other tires with respect to an evaluation value for braking performance of the Conventional Example Tire set at 100. The evaluation results are combined in Table 1. In the evaluation results of Table 1 the higher the evaluation index the higher the performance, namely a higher value indicates excellent braking performance.

It can be seen from Table 1 that the Example Tire and the Comparative Example Tires 2 and 3 result in greatly superior braking performance compared to the Conventional Example Tire.

Consequently, it can be seen in the current Test Examples that the Example Tire has equivalent resistance to uneven wear performance to the Conventional Example Tire, and greatly superior braking performance to that of the Conventional Example Tire.

While embodiments of the present invention have been explained by way of the above exemplary embodiments these are merely examples of embodiments, and various modifications can be made within a scope not departing from the spirit. Obviously the scope of rights of the present invention is also not limited by the exemplary embodiments above.

The invention claimed is:

1. A tire comprising:
a plurality of blocks formed in a tread section by circumferential direction grooves and lateral grooves, wherein:
each of the blocks is a polygonal shape viewed from the tread face side, the polygonal shape comprising long sides, adjacent to the circumferential direction grooves, and short sides, and wherein a cutout portion is formed on the side of at least one of the long sides of the blocks,
the circumferential direction grooves include a pair of center grooves, and a center block row of the blocks is disposed between the center grooves on an equatorial plane of the tire,
the center grooves extend in a zigzag shape, and
center lug grooves connect together locations where a separation distance between the center grooves is smallest, the center lug grooves being formed at the center block row,
wherein the long sides are formed together with the cutout portions on both the tire width direction sides of the block,
wherein:
the external profile of each of the cutout portions, when seen in plan view, is a triangular shape including a bottom side formed by at least a portion of the long side, and a long sloping side and a short sloping side having different lengths from each other; and
along one tire circumferential direction, the disposed sequence of the long sloping side and the short sloping side is different on one tire width direction side of the block to on the other width direction side of the block,
wherein:
the shape of the cutout portions is symmetrical about a point at the center of the block; and
the block comprises a block traversing groove that is open at both tire width direction sides of the block at a first position and a second position, respectively, each of the first and second positions corresponds to a vertex formed by the bottom side and the long sloping side of the cutout portion having a triangular shape,
wherein:
the plurality of blocks comprises a shoulder block row including shoulder blocks, a shoulder block of the shoulder blocks comprising a fine groove connected to an outer groove of the circumferential direction grooves at one end and the other end of the fine groove terminating within the shoulder block, and
wherein a tire width direction separation distance between one side width direction end of the cutout portion and the other side width direction end of the cutout portion is in the range of 7 to 12% of the tire width direction separation distance between one side width direction end of the corresponding block and the other side width direction end of the block.

2. The tire of claim 1, wherein:
the length ratio of the short side to the long side is in the range of 25 to 85%.

3. The tire of claim 1, wherein:
the depth of the cutout portion at the deepest location from the tread face is in the range of 20 to 40% of the depth of the circumferential direction groove adjacent to the cutout portion; and
the wall face of the cutout portion slopes downwards from the tread face.

4. The tire of claim 1, wherein the plurality of blocks further comprises a second block row provided between the center block row and the shoulder block row, the second block row including second blocks,
wherein each second block comprises a second block traversing groove, and
wherein each end of the block traversing groove and the second block traversing groove is connected to one of the circumferential direction grooves.

5. The tire of claim 4, wherein the shoulder block row comprises a shoulder lug groove provided between adjacent shoulder blocks, and
wherein a width of the shoulder lug groove increases from an inner end of the lug groove toward an outer end of the lug groove with respect to the equatorial plane of the tire.

6. The tire of claim 5, wherein the second block row comprises second lug grooves connecting together locations where a separation distance between the center grooves the center groove and the outer groove is the smallest,
wherein each end of the block traversing groove is located at an end portion of the second lug grooves,
wherein each end of the second block traversing groove is located at an end portion of one of the center lug grooves and the shoulder lug groove, and
wherein the one end of the fine groove is located at an end portion of the second lug grooves.

7. The tire of claim 1, wherein the shoulder block row comprises a shoulder lug groove provided between adjacent shoulder blocks, and
wherein a width of the shoulder lug groove is wider than widths of the circumferential direction grooves.

8. The tire of claim 1, wherein the plurality of blocks further comprises a second block row provided between the center block row and the shoulder block row,
wherein the second block row comprises second lug grooves connecting together locations where a separation distance between the center grooves the center groove and the outer groove is the smallest, and
wherein widths of the second lug grooves are wider than widths of the circumferential direction grooves.

9. The tire of claim 1, wherein widths of the center lug grooves are narrower than widths of second lug grooves of a second block row provided between the center block rows and the shoulder block row, and wherein the widths of the center lug grooves are narrower than widths of shoulder lug grooves of the shoulder block row.

10. The tire of claim 1, wherein each corner of the blocks has an obtuse angle.

11. The tire of claim 1, wherein the following relationship is satisfied:

A>B>C, where

A represents widths of shoulder lug grooves of the shoulder block row;
B represents widths of second lug grooves of a second block row provided between the center block rows and the shoulder block row, and
C represents widths of the center lug grooves.

* * * * *